US011185944B2

(12) United States Patent
Ohashi et al.

(10) Patent No.: US 11,185,944 B2
(45) Date of Patent: Nov. 30, 2021

(54) FRICTION STIR SPOT WELDING DEVICE AND FRICTION STIR SPOT WELDING METHOD

(71) Applicant: KAWASAKI JUKOGYO KABUSHIKI KAISHA, Kobe (JP)

(72) Inventors: Ryoji Ohashi, Kobe (JP); Yoshitaka Muramatsu, Akashi (JP); Masahiro Miyake, Kobe (JP); Takuya Fukuda, Kakogawa (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 16/344,762

(22) PCT Filed: Oct. 31, 2017

(86) PCT No.: PCT/JP2017/039246
§ 371 (c)(1),
(2) Date: Apr. 24, 2019

(87) PCT Pub. No.: WO2018/079806
PCT Pub. Date: May 3, 2018

(65) Prior Publication Data
US 2019/0262934 A1 Aug. 29, 2019

(30) Foreign Application Priority Data
Oct. 31, 2016 (JP) .............................. JP2016-212533

(51) Int. Cl.
*B23K 20/12* (2006.01)

(52) U.S. Cl.
CPC .......... *B23K 20/1235* (2013.01); *B23K 20/12* (2013.01)

(58) Field of Classification Search
CPC ............................................. B23K 20/122–128
See application file for complete search history.

(56) References Cited

U.S. PATENT DOCUMENTS

| 4,106,167 A * | 8/1978 | Luc ..................... B21D 51/2676 29/33 D |
| 7,032,801 B2 * | 4/2006 | Raether .............. B23K 20/1235 228/2.1 |
| 7,530,486 B2 * | 5/2009 | Flak ................... B23K 20/1255 228/112.1 |

(Continued)

FOREIGN PATENT DOCUMENTS

| JP | 2006-000901 A | 1/2006 |
| JP | 2007-275980 A | 10/2007 |

(Continued)

*Primary Examiner* — Kiley S Stoner
*Assistant Examiner* — Carlos J Gamino
(74) *Attorney, Agent, or Firm* — Oliff PLC

(57) ABSTRACT

During friction stir spot welding, a controller executes a temperature holding control in which the controller controls a rotation driving unit so that a rotational speed of a tool is set to a value which is equal to or lower than a predetermined rotational speed at which a temperature of the tool is regarded as being equal to a welding temperature of lapped portions, and in which the controller controls a displacement driving unit to increase and reduce a welding pressure or plunge depth of the tool so that the temperature of the tool is held in a predetermined set range.

8 Claims, 9 Drawing Sheets

(56) References Cited

U.S. PATENT DOCUMENTS

| | | | |
|---|---|---|---|
| 7,938,309 B2* | 5/2011 | Bordesoules | B23K 20/122 228/112.1 |
| 8,556,156 B1* | 10/2013 | Bharadwaj | B23K 20/1255 228/102 |
| 8,657,179 B1* | 2/2014 | Ding | B23K 20/26 228/2.1 |
| 9,751,153 B2* | 9/2017 | Ross | G05B 19/188 |
| 10,201,873 B2* | 2/2019 | Okada | B23K 20/124 |
| 2002/0158109 A1* | 10/2002 | Gendoh | B23K 20/123 228/112.1 |
| 2004/0046003 A1* | 3/2004 | Vyas | B23K 20/123 228/112.1 |
| 2005/0051602 A1* | 3/2005 | Babb | B23K 20/123 228/112.1 |
| 2008/0083817 A1* | 4/2008 | Baumann | B23K 20/123 228/102 |
| 2009/0255980 A1* | 10/2009 | Li | B23K 20/123 228/102 |
| 2010/0078462 A1 | 4/2010 | Babb et al. | |
| 2010/0136369 A1* | 6/2010 | Ayer | C22C 38/001 428/683 |
| 2010/0178526 A1* | 7/2010 | Fujii | B23K 20/1235 428/615 |
| 2011/0172802 A1 | 7/2011 | Babb et al. | |
| 2012/0185075 A1* | 7/2012 | Babb | B23K 20/1235 700/145 |
| 2012/0261457 A1 | 10/2012 | Ohashi et al. | |
| 2013/0112736 A1* | 5/2013 | Kato | B23K 20/1265 228/112.1 |
| 2014/0027496 A1* | 1/2014 | Castillo | B23K 20/1235 228/102 |
| 2014/0069986 A1* | 3/2014 | Okada | B23K 20/123 228/112.1 |
| 2014/0207274 A1* | 7/2014 | Ross | B23K 20/125 700/207 |
| 2015/0328714 A1* | 11/2015 | Larsson | B23K 37/02 228/112.1 |
| 2015/0360317 A1* | 12/2015 | Kalvala | B32B 15/01 228/2.3 |
| 2016/0184922 A1* | 6/2016 | Kikyo | B23K 20/2275 228/114.5 |
| 2017/0246707 A1* | 8/2017 | Bray | B23K 20/1225 |
| 2017/0304935 A1 | 10/2017 | Okada et al. | |
| 2018/0221986 A1 | 8/2018 | Odakura et al. | |
| 2018/0221987 A1* | 8/2018 | Weigl | B23K 20/1235 |
| 2018/0243873 A1* | 8/2018 | Yamamoto | G01K 3/005 |
| 2019/0262934 A1* | 8/2019 | Ohashi | B23K 20/1225 |

FOREIGN PATENT DOCUMENTS

| | | |
|---|---|---|
| JP | 2008-073694 A | 4/2008 |
| JP | 2011-115842 A | 6/2011 |
| JP | 5739804 B2 | 6/2015 |
| JP | 5883978 B1 | 3/2016 |
| WO | 2016/063538 A1 | 4/2016 |

* cited by examiner

| Highest tool temperature | | | |
|---|---|---|---|
| Welding pressure(N) | Rotational speed(rpm) | | |
| | 750 | 1500 | 2000 |
| 14700 | 1042 | 1150 | 1153 |
| 19600 | 1119 | 1142 | 1134 |
| 24500 | 1099 | 1128 | 1124 |

| Highest material temperature | | | |
|---|---|---|---|
| Welding pressure(N) | Rotational speed(rpm) | | |
| | 750 | 1500 | 2000 |
| 14700 | 1043 | 1126 | 1150 |
| 19600 | 1076 | 1083 | 1027 |
| 24500 | 1093 | 1028 | 998 |

| Highest temperature difference between material temperature and tool temperature | | | |
|---|---|---|---|
| Welding pressure(N) | Rotational speed(rpm) | | |
| | 750 | 1500 | 2000 |
| 14700 | 1 | 24 | 103 |
| 19600 | 43 | 59 | 107 |
| 24500 | 6 | 100 | 126 |

| Error% (between tool temperature and material temperature) | | | |
|---|---|---|---|
| Welding pressure(N) | Rotational speed(rpm) | | |
| | 750 | 1500 | 2000 |
| 14700 | 0.095877※ | 2.131439※ | 9.809524 |
| 19600 | 3.996283※ | 5.44783 | 10.4187 |
| 24500 | 0.548948※ | 9.727626 | 12.62525 |

※ : Less than 5%

Fig.9

FRICTION STIR SPOT WELDING DEVICE AND FRICTION STIR SPOT WELDING METHOD

TECHNICAL FIELD

The present invention relates to a friction stir spot welding device and a friction stir spot welding method, in which a plurality of plate materials are lapped to each other and spot welded to each other.

BACKGROUND ART

Conventionally, friction spot joining (FSJ) is known as a method of spot joining (welding) a plurality of plate materials (e.g., see Patent Literature 1). In the friction spot joining, a tool having a projection at a tip end is rotated and plunged into lapped portions of the plate members, to soften the lapped portions by friction heat and stir them, and thereafter is pulled out (drawn out), and the lapped portions are cooled so that the plate materials are joined (welded) to each other.

CITATION LIST

Patent Literature

Patent Literature 1: Japanese Laid-Open Patent Application Publication No. 2011-115842

SUMMARY OF INVENTION

Technical Problem

However, in a conventional control method of the friction spot joining (friction stir spot welding), there is a correlation between a plunge depth of the tool and a joining (welding) temperature. In a case where the tool is plunged to a large depth to obtain strength, the welding temperature becomes unnecessarily high. In a case where a material such as a steel material, whose temperature tends to rise during the friction stir spot welding, is a welding target, the welding temperature exceeds a specified temperature, and the material is cooled after the welding This causes the material to be transformed and quenched. As a result, a joint becomes brittle. In particular, in the spot welding, the tool does not move in a planar direction and stays at a specified position. As a result, the welding temperature is significantly increased.

If the plunge depth of the tool is reduced and the welding temperature is lowered to prevent the quenching, fluidity of the plasticized material is reduced during the friction stir spot welding, and an adequate welded spot (region) is not formed. This causes reduction of a joint strength. On the other hand, if the plunge depth of the tool is increased to stir the material more, the fluidity of the plasticized material is increased and a large welded spot can be formed. However, the material reaches a transformation completion temperature and becomes brittle in some cases. In brief, in the conventional art, a control method for controlling/managing a final plunge depth of the tool and the welding temperature at the same time has not been developed. In addition, another problem exists. In the spot welding, the welding temperature increases monotonously. For this reason, the tool temperature and the welding temperature tend to be deviated from each other. If a control based on the tool temperature is performed, accuracy of the welding temperature is reduced.

In view of the above-described circumstances, an object of the present invention is to control the welding temperature with high accuracy to manage transformation in the welded spot of the plate materials, while realizing a highest possible welding temperature to stir the plate materials better.

Solution to Problem

According to an aspect of the present invention, there is provided a friction stir spot welding device which performs spot welding of a plurality of plate materials which are lapped to each other, the friction stir spot welding device comprising: a displacement driving unit which displaces lapped portions of the plurality of plate materials and a tool relatively to each other; a rotation driving unit which rotates the tool; and a controller which controls the displacement driving unit and the rotation driving unit so that the tool is plunged into the lapped portions while rotating the tool, to perform friction stir spot welding, wherein during the friction stir spot welding, the controller executes a temperature holding control in which the controller controls the rotation driving unit so that a rotational speed of the tool is set to a value which is equal to or lower than a predetermined rotational speed at which a temperature of the tool is regarded as being equal to a welding temperature of the lapped portions, and in which the controller controls the displacement driving unit to increase and reduce a welding pressure or plunge depth of the tool so that the temperature of the tool is held in a predetermined set range.

In accordance with this configuration, the welding temperature can be held (kept) within the predetermined set range so that the welding temperature does not exceed a desired highest temperature, by increasing and reducing the welding pressure of the tool or plunge depth of the tool according to the tool temperature. In this case, the rotational speed of the tool is set to a rotational speed at which the tool temperature can be regarded as being equal to the welding temperature of the plate materials. This makes it possible to accurately hold (keep) the welding temperature of the plate materials within a desired range with reference to the tool temperature. Therefore, it becomes possible to control the welding temperature with high accuracy to control transformation in the welded spot of the plate materials, while realizing a highest possible welding temperature to stir the plate materials better.

During the temperature holding control, the controller may control the displacement driving unit so that the welding pressure or plunge depth of the tool is increased and reduced repeatedly in a predetermined change pattern, in a state in which the temperature of the tool is within the predetermined set range, may control the displacement driving unit so that the welding pressure or plunge depth of the tool is reduced, when the temperature of the tool exceeds the predetermined set range, and may control the displacement driving unit so that the welding pressure or plunge depth of the tool is increased, when the temperature of the tool falls below the predetermined set range.

In accordance with this configuration, since the welding pressure or plunge depth of the tool is increased and reduced repeatedly in the predetermined change pattern, the welding temperature can easily fall into the set range. In addition, the plasticized material can be stirred regularly. At a time point when the tool temperature becomes outside the set range, the welding pressure or plunge depth of the tool is increased and reduced so that the tool temperature returns to one within the set range. In this way, the welding temperature can be held (kept) in a desired temperature range.

During the temperature holding control, the controller may control the displacement driving unit so that at least one of a frequency of the change pattern and application time of a maximum welding pressure is reduced, when the temperature of the tool exceeds the predetermined set range, and may control the displacement driving unit so that at least one of the frequency of the change pattern and the application time of the maximum welding pressure is increased, when the temperature of the tool falls below the predetermined set range.

In accordance with this configuration, the welding temperature can be adjusted simply and smoothly.

In a case where the controller determines that the tool has reached a predetermined completion depth of the lapped portions in the temperature holding control, the controller may control the displacement driving unit to pull the tool out of the lapped portions.

In accordance with this configuration, the transformation can be managed by controlling the welding temperature of the welded spot with high accuracy, by the temperature holding control. The friction stir spot welding is terminated at a time point when the tool reaches the predetermined plunge depth. Under this condition, the welding operation can be continued until the tool reaches a sufficient depth of the lapped portions. As a result, the transformation in the plate materials can be managed with high accuracy and the tool can be plunged to a sufficient depth with high accuracy.

The controller may execute an initial plunge control in which the controller controls the displacement driving unit and the rotation driving unit so that a welding pressure of the tool and a rotational speed of the tool become constant until the controller determines that the tool has reached a predetermined initial depth of the lapped portions, and may execute the temperature holding control when the controller determines that the tool has reached the predetermined initial depth.

In accordance with this configuration, the tool can be reliably plunged into the lapped portions of the plate materials at an initial stage of welding, even in a case where the plate material has a surface with a low friction coefficient. Therefore, the friction stir spot welding with a high reproducibility can be realized while performing the temperature holding control.

The controller may obtain as the temperature of the tool an inner temperature of the tool in a region which is within 2 mm from a contact surface of the tool which contacts the lapped portions.

In accordance with this configuration, the temperature holding control can be performed with high accuracy.

During the temperature holding control, the controller may control the rotation driving unit to adjust the rotational speed of the tool so that the temperature of the tool is held in the predetermined set range.

In accordance with this configuration, the temperature of the tool is adjusted based on the welding pressure or the plunge depth and the rotational speed. This makes it possible to improve responsivity of the temperature control.

According to an aspect of the present invention, there is provided a friction stir spot welding method which performs spot welding of a plurality of plate materials which are lapped to each other, the friction stir spot welding method comprising: plunging a tool into lapped portions of the plurality of plate materials while rotating the tool, to initiate friction stir spot welding; rotating the tool at a rotational speed at which a temperature of the tool is regarded as being equal to a welding temperature of the lapped portions, during the friction stir spot welding; and adjusting a welding pressure or plunge depth of the tool so that the temperature of the tool is held within a predetermined set range during the friction stir spot welding.

Advantageous Effects of Invention

In accordance with the present invention, it is possible to control a welding temperature with high accuracy to control transformation in a welded spot of plate materials, while realizing a highest possible welding temperature to stir the plate materials better.

BRIEF DESCRIPTION OF DRAWINGS

FIG. 9 is a view showing a result of an experiment for comparison conducted under nine conditions in which the welding pressure and the rotational speed are changed.

DESCRIPTION OF EMBODIMENTS

Hereinafter, the embodiment will be described with reference to the drawings.

Figure 1:
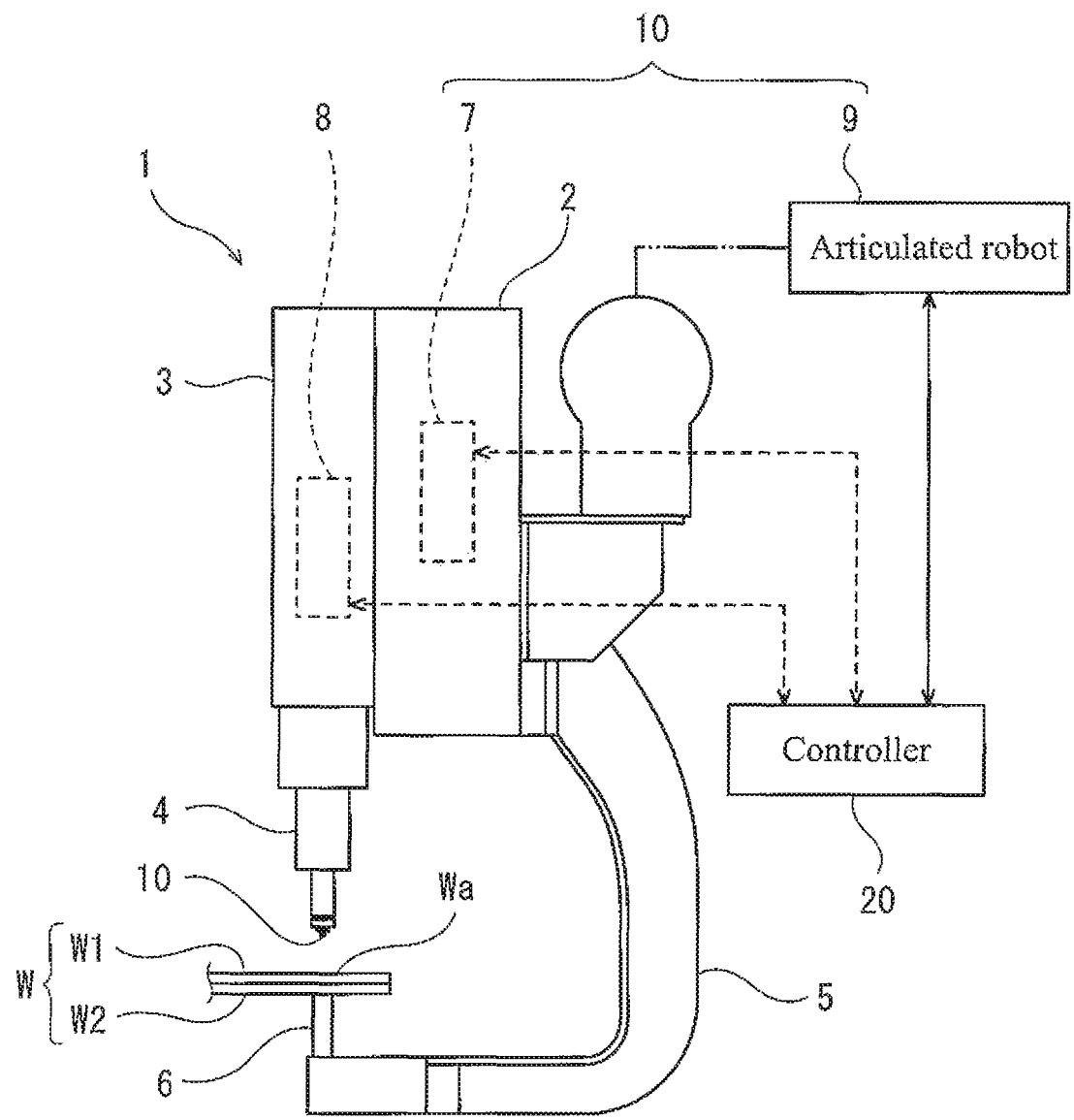
FIG. 1 is a view schematically showing the configuration of a friction stir spot welding device according to an embodiment.

FIG. 1 is a view schematically showing the configuration of a friction stir spot welding device 1 according to the embodiment. As shown in FIG. 1, a workpiece W includes a pair of plate materials W1, W2 which are lapped to each other. The workpiece W is made of a steel material. The friction stir spot welding device 1 is configured to perform spot welding of lapped portions Wa of the pair of plate materials W1, W2. The friction stir spot welding device 1 includes a base 2, a movable member 3 mounted on the base 2, and a tool retaining member 4 protruding from the movable member 3 toward the workpiece W. The movable member 3 is mounted on the base 2 so that the movable member 3 is slidable along the axis line of the tool retaining member 4. The tool retaining member 4 is rotatable around its axis line. A tool 11 is detachably mounted on the tip end portion of the tool retaining member 4. A curved frame 5 which is curved in a substantially-L shape is secured to the base 2. The curved frame 5 extends to a location at which its tip end portion faces the tool 11. A support base 6 is provided at the tip end portion of the curved frame 5 to support the workpiece W.

The base 2 is provided with a linear motion driving unit 7 which slides the movable member 3 in the axial direction of the tool retaining member 4. The linear motion driving unit 7 slides the movable member 3 to advance and retract the tool 11 with respect to the workpiece W. The movable member 3 is provided with a rotation driving unit 8 which rotates the tool retaining member 4 around the axis line of the tool retaining member 4. The rotation driving unit 8 rotates the tool retaining member 4 to rotate the tool 11. An articulated (multi-joint) robot 9 is mounted on the base 2. The articulated robot 9 displaces the base 2 to displace the tool 11 to a desired position with respect to the workpiece W. In brief, the linear motion driving unit 7 and the articulated robot 9 serve as a displacement driving unit 10 which displaces the workpiece W and the tool 11 relatively to each other.

The friction stir spot welding device 1 includes a controller 20 which controls the linear motion driving unit 7, the rotation driving unit 8, and the articulated robot 9. The controller 20 may be a single control unit with an integrated function, or a plurality of control units with distributed functions. The controller 20 includes a processor, a volatile memory, a non-volatile memory, an I/O interface, or the like. In response to a command input via the I/O interface by an input device (e.g., computer or teaching pendant) which is not shown, the processor of the controller 20 performs calculations (computations) by use of the volatile memory based on an operation program stored in the non-volatile memory, and the controller 20 communicates with the rotation driving unit 8 and the displacement driving unit 10 via the I/O interface. The friction stir spot welding device 1 performs friction stir spot welding in such a way that the controller 20 controls the rotation driving unit 8 and the displacement driving unit 10 to plunge the tool 11 into the lapped portions Wa of the pair of plate materials W1, W2 while rotating the tool 11, and to stir and plasticize a portion softened by friction heat, of the lapped portions Wa.

Figure 2:
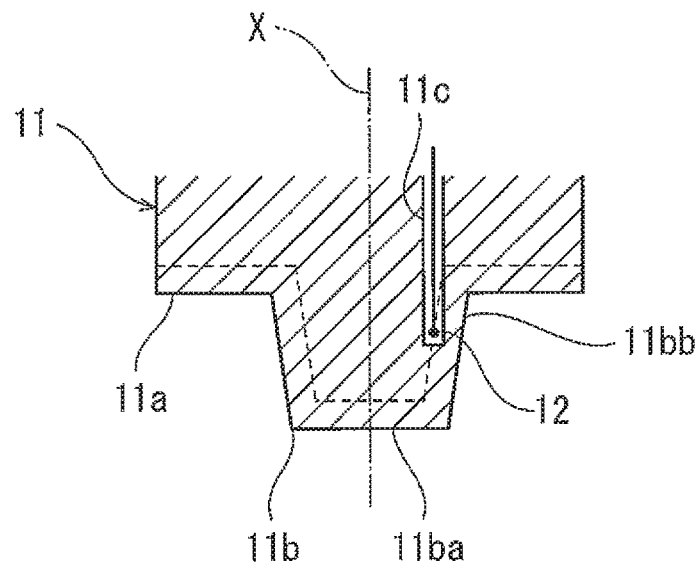
FIG. 2 is an enlarged cross-sectional view of a tool used in the friction stir spot welding device of FIG. 1.

FIG. 2 is an enlarged cross-sectional view of the tool 11 used in the friction stir spot welding device 1 of FIG. 1. As shown in FIG. 2, the tool 11 includes a tool body 11a, and a pin 11b protruding from the center of the tool body 11a toward the workpiece W, the pin 11b having a diameter smaller than that of the tool body 11a. The tool 11 has a bottomed hole (hole with a bottom) 11c which reaches an inside of the pin 11b. A thermocouple 12 is inserted into the bottomed hole 11c as a temperature sensor. The thermocouple 12 is provided inside the tool 11 at a location which is close to a contact surface of the tool 11 which contacts the workpiece W (e.g., location that is within 2 mm from the contact surface). The thermocouple 12 is configured to obtain a temperature of the inner region of the tool 11.

A load in the direction of an axis line X (reaction force from the workpiece W) which is applied to the tool 11 during the friction stir spot welding, is greater in a tip end surface 11ba than in a side peripheral surface 11bb. In view of this, in the present embodiment, the bottomed hole 11c into which the thermocouple 12 is inserted is closer to the side peripheral surface 11bb of the pin 11b than to the tip end surface 11ba of the pin 11b. The thermocouple 12 is disposed inside the pin 11b at a location that is closer to the side peripheral surface 11bb than to the tip end surface 11ba. More specifically, the thermocouple 12 is disposed at a location that is within 2 mm (e.g., 1 mm) from the side peripheral surface 11bb of the pin 11b. This makes it possible to keep a strength of the pin 11b with respect to the load in the direction of the axis line X, in a state in which the thermocouple 12 is disposed close to the surface of the pin 11b (contact surface of the pin 11b which contacts the workpiece W).

Figure 3:
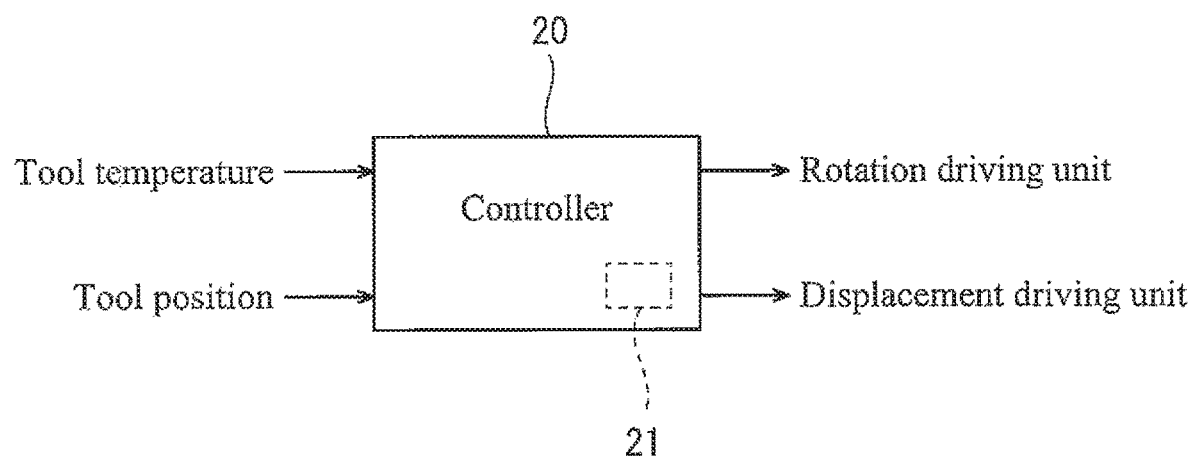
FIG. 3 is a control block diagram of the friction stir spot welding device of FIG. 1

FIG. 3 is a control block diagram of the friction stir spot welding device 1 of FIG. 1. As shown in FIG. 3, the controller 20 receives as inputs, the temperature of the tool 11 (hereinafter will be referred to as a tool temperature) detected by the thermocouple 12, and the position of the tool 11 (hereinafter will be referred to as a tool position) with respect to the workpiece W which is detected by the displacement driving unit 10. A control program 21 is pre-stored in the controller 20. The controller 20 is configured to execute the control program 21 to control the rotation driving unit 8 and the displacement driving unit 10 based on the tool temperature and the tool position which are input.

Figure 4:
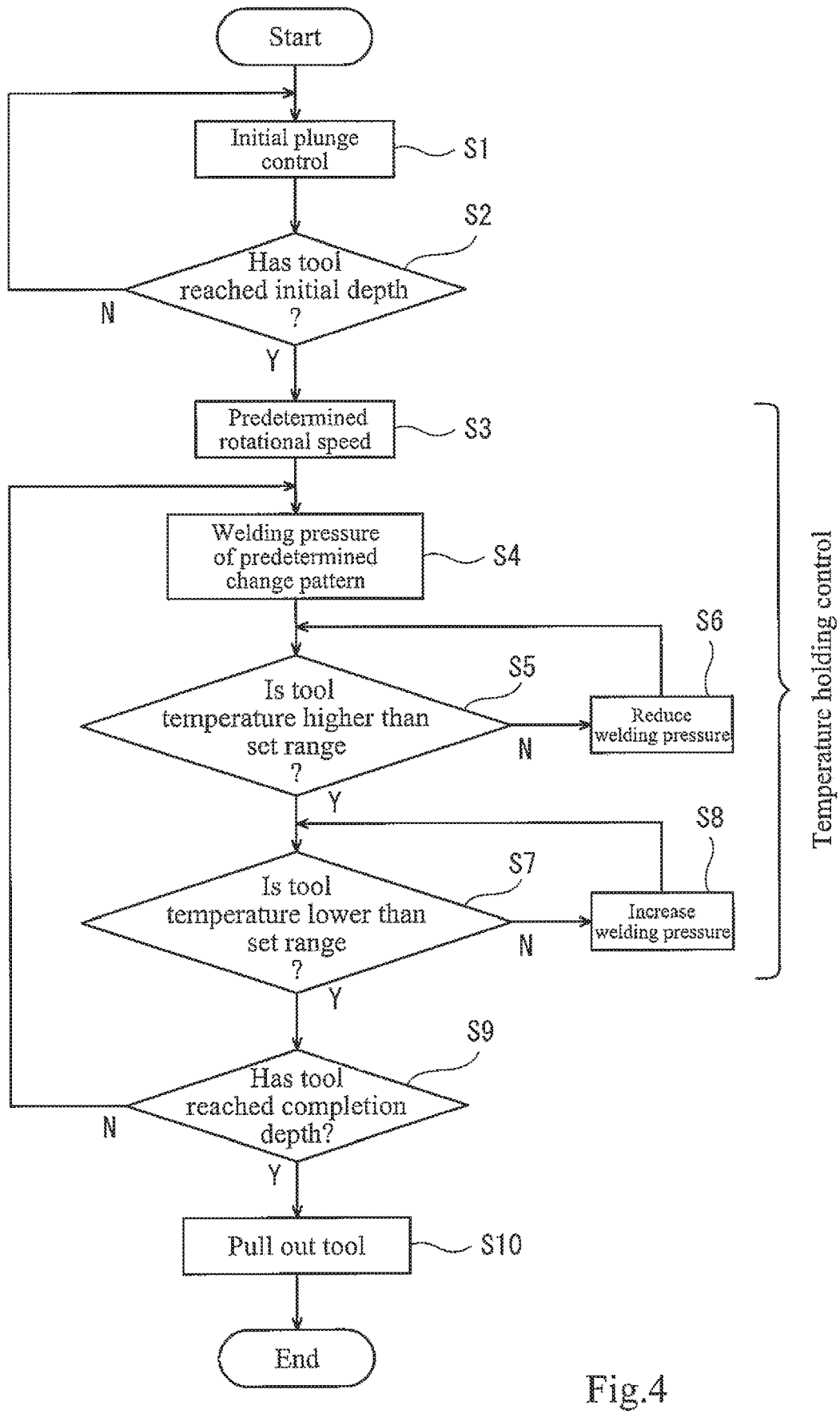
FIG. 4 is a flowchart showing a control procedure of the friction stir spot welding device of FIG. 1.
Figure 5:
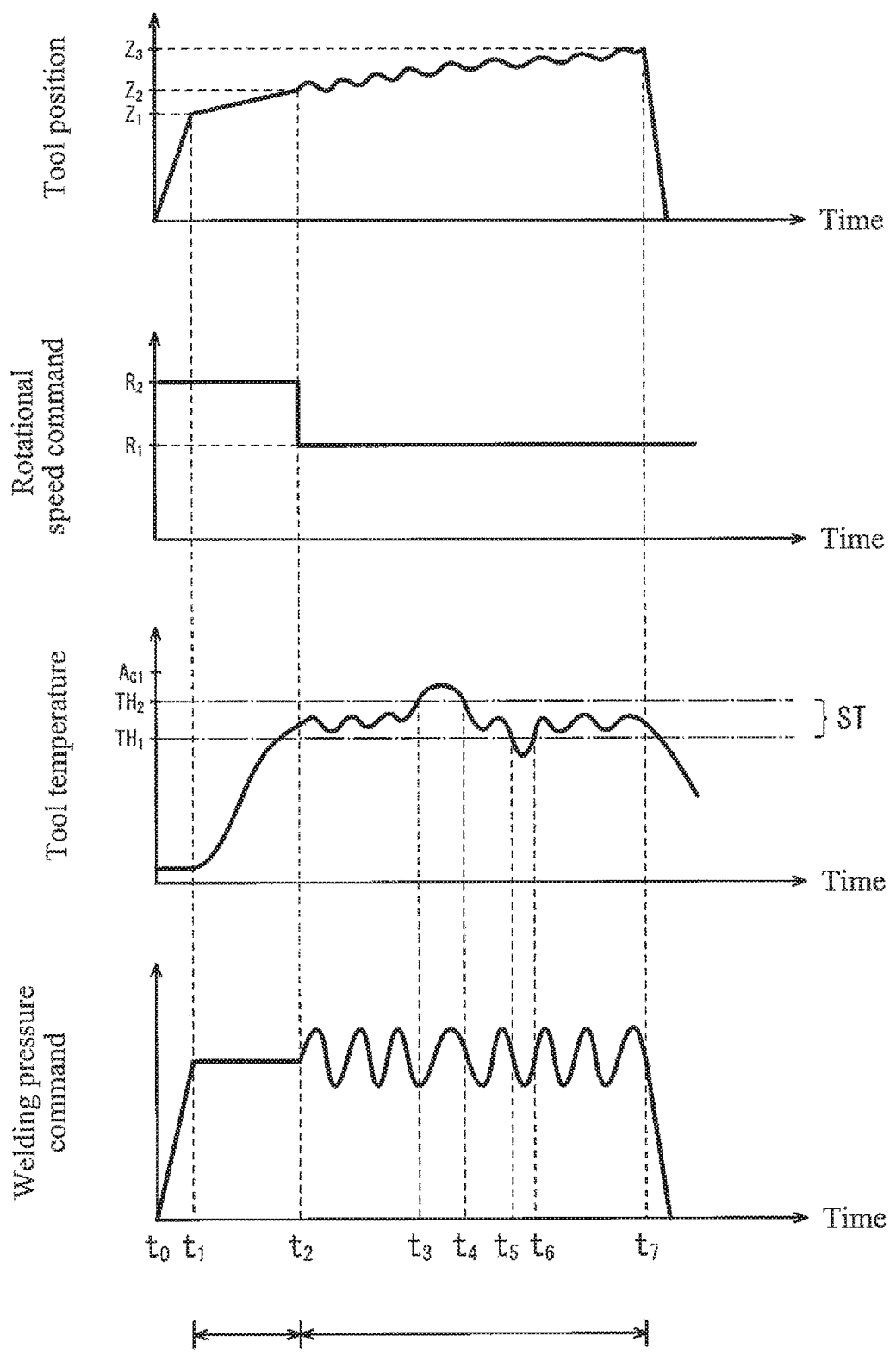
FIG. 5 is a timing chart of a tool position, a rotational speed, a tool temperature, and a welding pressure command during execution of the control of FIG. 4.

FIG. 4 is a flowchart showing a control procedure of the friction stir spot welding device 1 of FIG. 1. FIG. 5 is a timing chart of the tool position, the rotational speed command, the tool temperature, and the welding pressure command during execution of the control of FIG. 4. Referring to FIGS. 4 and 5, initially, the controller 20 moves the tool 11 toward the lapped portions Wa of the workpiece W (tool position $Z_1$: time $t_0$-$t_1$), and executes an initial plunge control for controlling the rotation driving unit 8 and the displacement driving unit 10 so that the tool 11 is plunged into the lapped portions Wa in a state in which the rotational speed of the tool 11 is set to a rotational speed $R_2$ which is higher than that during a temperature holding control (step S1: time $t_1$-$t_2$). During the initial plunge control, the command value of the welding pressure applied by the tool 11 and the command value of the rotational speed of the tool 11 are constant, the tool 11 is slowly plunged into the lapped portions Wa, and the tool temperature is gradually increased. In this state, the friction stir spot welding is performed. By executing the initial plunge control in a state in which the rotational speed of the tool is set to the rotational speed $R_2$ which is higher than that during the temperature holding control which will be described later, the tool 11 can be reliably plunged into the lapped portions Wa of the workpiece W at an initial stage of welding, even in a case where the plate material is a plate material (e.g., plated plate) having a surface with a low friction coefficient. Therefore, the friction stir spot welding with a high reproducibility can be realized even when the temperature holding control is performed in a later step. Alternatively, the initial plunge control may be omitted, and the temperature holding control may be executed at a time point when the tool starts to be plunged into the lapped portions Wa.

During the initial plunge control, the controller 20 determines whether or not the tool 11 has reached a predetermined initial depth D1 (tool position $Z_2$) of the lapped portions Wa, to be precise, whether or not the tip end surface 11ba of the tool 11 has reached the predetermined initial depth D1 of the upper plate material W1 (step S2). In a case where the controller 20 determines that the tool 11 has not reached the predetermined initial depth D1 yet, the controller 20 continues step S1. On the other hand, in a case where the controller 20 determines that the tool 11 has reached the predetermined initial depth D1, the controller 20 moves to the temperature holding control. Note that in step S2, the tool temperature may be a determination target instead of the tool position. In this case, in step S2, the controller 20 may determine whether or not the tool temperature has reached a predetermined temperature (e.g., predetermined temperature within a set range ST which will be described later) (temperature which is $TH_1$ or higher and $TH_2$ or lower), instead of determining whether or not the tool 11 has reached the predetermined initial depth D1 of the lapped portions Wa.

In the temperature holding control, the controller 20 controls the rotation driving unit 8 to set the rotational speed of the tool 11 to a rotational speed $R_1$ at which the tool temperature is regarded as being equal to the welding temperature of the lapped portions Wa (step S3). In addition, the controller 20 controls the displacement driving unit 10 to adjust the welding pressure applied by the tool 11 so that the welding pressure is increased and reduced repeatedly in a predetermined change pattern (step 4: time $t_2$-$t_7$). Alternatively, in the temperature holding control, the controller 20 may adjust the welding pressure applied by the tool 11 by adjusting the plunge depth (position) of the tool 11 into the workpiece W so that the plunge depth is increased and reduced repeatedly in a predetermined change pattern.

Figure 6:
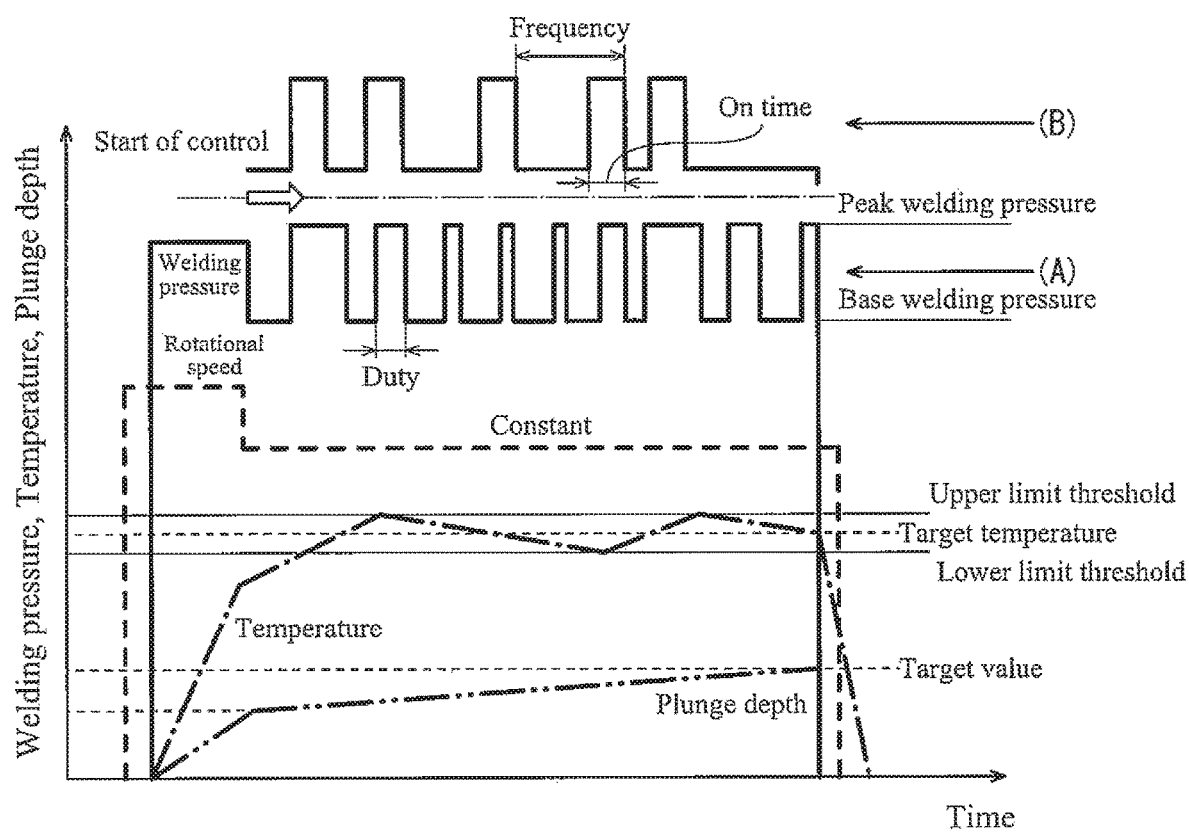
FIG. 6 is a timing chart of a welding pressure command, a rotational speed, a tool temperature, and a tool plunge depth according to a modified example.
Figure 7:
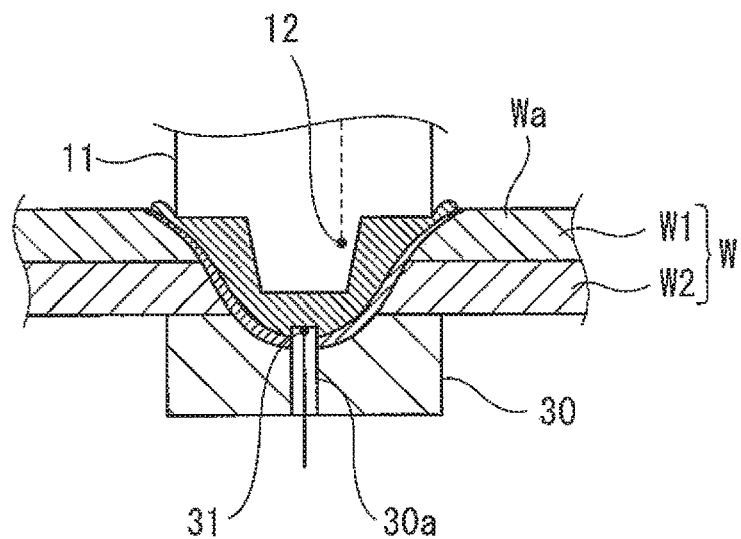
FIG. 7 is a cross-sectional view showing an experiment for comparison between the tool temperature and the welding temperature.

The rotational speed $R_1$ at which the tool temperature is regarded as being equal to the welding temperature will be described later (see FIGS. 6 and 7). In the present embodiment, the change pattern is a sinusoidal (sine) wave pattern with a specified amplitude, a specified average welding pressure, and a specified frequency. Thus, since the welding pressure of the tool is increased and reduced repeatedly in the predetermined change pattern, the welding temperature easily falls into the set range ST, and the plasticized material can be regularly stirred. Note that the change pattern may be another pattern (e.g., rectangular wave pattern) so long as the welding pressure is increased and reduced so that the tool temperature can be held (kept) within the predetermined set range ST (range of $TH_1$ or higher and $TH_2$ or lower).

Then, the controller 20 determines whether or not the tool temperature has exceeded the set range ST. More specifically, the controller 20 determines whether or not the tool temperature has exceeded the upper limit threshold $TH_2$ of the set range ST (step S5). In the present embodiment, the upper limit threshold $TH_2$ is set to a temperature lower than an $Ac_3$ transformation point (austenite transformation completion temperature (temperature at which austenite transformation completes) in heating). More specifically, the upper limit threshold $TH_2$ is set to a temperature which is higher than an $Ac_1$ transformation point (austenite generation start temperature (temperature at which austenite starts to be generated) in heating) and lower than the $Ac_3$ transformation point (austenite transformation completion temperature in heating). However, in a case where a good stirring state is secured, the upper limit threshold $TH_2$ may be set to a temperature lower than the $Ac_1$ transformation point. In a case where the controller 20 determines that the tool temperature is higher than the upper limit threshold $TH_2$, the controller 20 controls the displacement driving unit 10 to reduce the welding pressure applied by the tool 11 (step S6) and returns to step S5. In the present embodiment, in a case where the controller 20 determines that the tool temperature is higher than the upper limit threshold $TH_2$, the controller 20 sets the frequency of the change pattern to be lower than that of the change pattern in a case where the tool temperature is within the set range ST to reduce the welding pressure, while keeping the amplitude and average welding pressure of the change pattern constant (time $t_3$-$t_4$). Instead of or in addition to reducing the frequency, the controller 20 may set the average welding pressure of the change pattern to be lower than that of the change pattern in a case where the tool temperature is within the set range ST.

In a case where the controller 20 determines that the tool temperature is not higher than the upper limit threshold $TH_2$ (step S5), the controller 20 determines whether or not the tool temperature is lower than the set range ST, to be precise, whether or not the tool temperature is lower than the lower limit threshold $TH_1$ of the set range ST (step S7). The lower limit threshold $TH_1$ is defined as a temperature which is much higher than a temperature at which the workpiece W starts to be plasticized by friction heat and lower than the upper limit threshold $TH_2$. In a case where the controller 20 determines that the tool temperature is lower than the lower limit threshold $TH_1$, the controller 20 controls the displacement driving unit 10 to increase the welding pressure applied by the tool 11 (step S8), and returns to step S7. In the present embodiment, in a case where the controller 20 determines that the tool temperature is lower than the lower limit threshold $TH_1$, the controller 20 sets the frequency of the change pattern to be higher than that of the change pattern in a case where the tool temperature is within the set range ST to increase the welding pressure, while keeping the amplitude and average welding pressure of the change pattern constant (time $t_5$-$t_6$). Instead of or in addition to increasing the frequency, the controller 20 may set the average welding pressure of the change pattern to be higher than that of the change pattern in a case where the tool temperature is within the set range ST.

In a case where the controller 20 determines that the tool temperature is not lower than the lower limit threshold $TH_1$ (step S7), the controller 20 determines whether or not the tool 11 has reached a predetermined completion depth D2 (tool position $Z_3$) of the lapped portions Wa, to be precise, whether or not the tip end surface 11ba of the tool 11 has reached the predetermined depth of the lower plate material W2 (step S9). In the present embodiment, in a case where it is assumed that the upper surface (surface of the lapped portions Wa which is closer to the tool 11) of the plate material W1 is 0% and the lower surface (surface of the lapped portions Wa which is closer to the support base 6) of the plate material W2 is 100%, the completion depth D2 (D2>D1) is set to a position which is 75% or more in the lapped portions Wa. In a case where the controller 20 determines that the tool 11 has not reached the predetermined completion depth D2, the controller 20 returns to step S4. On the other hand, in a case where the controller 20 determines that the tool 11 has reached the predetermined completion depth D2 (tool position $Z_3$) (time $t_7$), the controller 20 controls the displacement driving unit 10 to pull (draw) out the tool 11 from the workpiece W to terminate the temperature holding control (step S10). Through the above steps, the friction stir spot welding of one spot of the workpiece W is finished. Then, the controller 20 shifts to the friction stir spot welding of another spot of the workpiece W, and executes a procedure which is the same as that described above.

In a case where the change pattern is the rectangular wave, the controller 20 may perform the temperature holding control by controlling a duty (ON time) and/or frequency of the welding pressure command. For example, as shown in a waveform of FIG. 6(A), in a case where the controller 20 determines that the tool temperature is higher than the upper limit threshold, the controller 20 may reduce the duty (ON time) of the welding pressure command in a state in which the frequency of the welding pressure command is set to a predetermined value, to reduce the welding pressure applied by the tool 11. On the other hand, in a case where the controller 20 determines that the tool temperature is lower than the lower limit threshold, the controller 20 may increase the duty (ON time) of the welding pressure command in a state in which the frequency of the welding pressure command is set to the predetermined value, to increase the welding pressure applied by the tool 11. Further, as shown in a waveform of FIG. 6(B), in a case where the controller 20 determines that the tool temperature is higher than the upper limit threshold, the controller 20 may reduce the frequency of the welding pressure command in a state in which the duty (ON time) of the welding pressure command is set to a predetermined value, to reduce the welding pressure applied by the tool 11. On the other hand, in a case where the controller 20 determines that the tool temperature is lower than the lower limit threshold, the controller 20 may increase the frequency of the welding pressure command in a state in which the duty (ON time) of the welding pressure command is set to the predetermined value, to increase the welding pressure applied by the tool 11.

Next, an experiment for comparison between the tool temperature and the welding temperature will be described. This experiment is conducted to decide the rotational speed $R_1$ of the tool 11 at which the tool temperature is regarded as being equal to the welding temperature, prior to the friction stir spot welding of an actual product. The tool temperature is obtained from the thermocouple embedded in the tool (see FIG. 2). The welding temperature is obtained from the thermocouple embedded in a region of the welded spot of the workpiece, the region being close to the pin, during the friction stir spot welding. To perform the work more easily, in the experiment, a dummy member 30 made of the same material as that of the workpiece W is sandwiched between the support base 6 of the friction stir spot welding device 1 and the lapped portions Wa of the workpiece W, and a thermocouple 31 is embedded in the dummy member 30, as shown in FIG. 7.

The dummy member 30 is in contact with the lower plate material W2. The dummy member 30 has a bottomed hole (hole with a bottom) 30a depressed (recessed) toward the workpiece W. The thermocouple 31 is inserted into the bottomed hole 30a as the temperature sensor. The thermocouple 31 is disposed inside the dummy member 30 at a location that is close to a contact surface of the dummy member 30 which contacts the workpiece W (e.g., within 2 mm from the contact surface).

The thermocouple 31 is provided at the dummy member 30 at a location where a heat (thermal) history which is the same as that of a region of the welded spot of the workpiece W, the region being closer to the pin, occurs, during the friction stir spot welding in which the tool 11 is plunged into the lapped portions Wa of the workpiece W while rotating the tool 11. Experiments for comparison are conducted, which obtain the tool temperature detected by the thermocouple 12 and the welding temperature detected by the thermocouple 31, at the same time, while the friction stir spot welding is performed under multiple conditions which are different in the rotational speed of the tool 11 in a state in which the welding pressure applied by the tool 11 is set to be equal to the welding pressure in the initial plunge control (step S1) in a case where the friction stir spot welding is performed for an actual product.

Figure 8A:
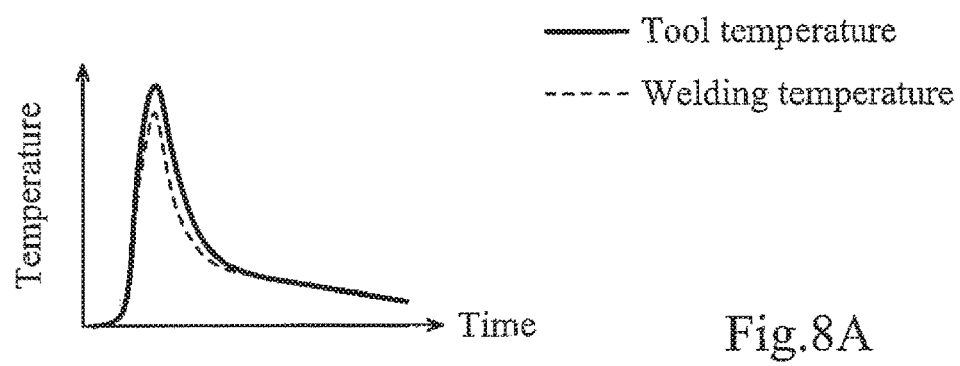
FIG. 8(A) is a graph showing an example in which the tool temperature is deviated from the welding temperature.
Figure 8B:
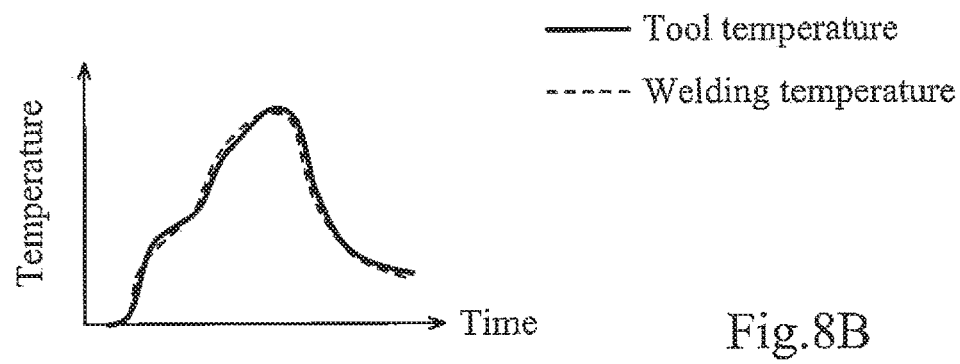
FIG. 8(B) is a graph showing an example in which the tool temperature is equal to the welding temperature.

In the experiments for comparison, the following conditions occur. As shown in FIG. 8(A), the temperature history of the tool temperature detected by the thermocouple 12 is deviated from the temperature history of the welding temperature detected by the thermocouple 31. As shown in FIG. 8(B), the temperature history of the tool temperature detected by the thermocouple 12 conforms to the temperature history of the welding temperature detected by the thermocouple 31. This is assumed to occur due to a difference in the plunge speed or the like of the tool 11, which is caused by a difference in the rotational speed of the tool 11. In light of this, a rotational speed range of the tool 11 under the condition in which the temperature history of the tool temperature detected by the thermocouple 12 is regarded as conforming to the temperature history of the welding temperature detected by the thermocouple 31 as shown in FIG. 8(B) is defined. The rotational speed under this condition is set to the rotational speed $R_1$ of the tool 11 during the temperature holding control.

Figure 10:
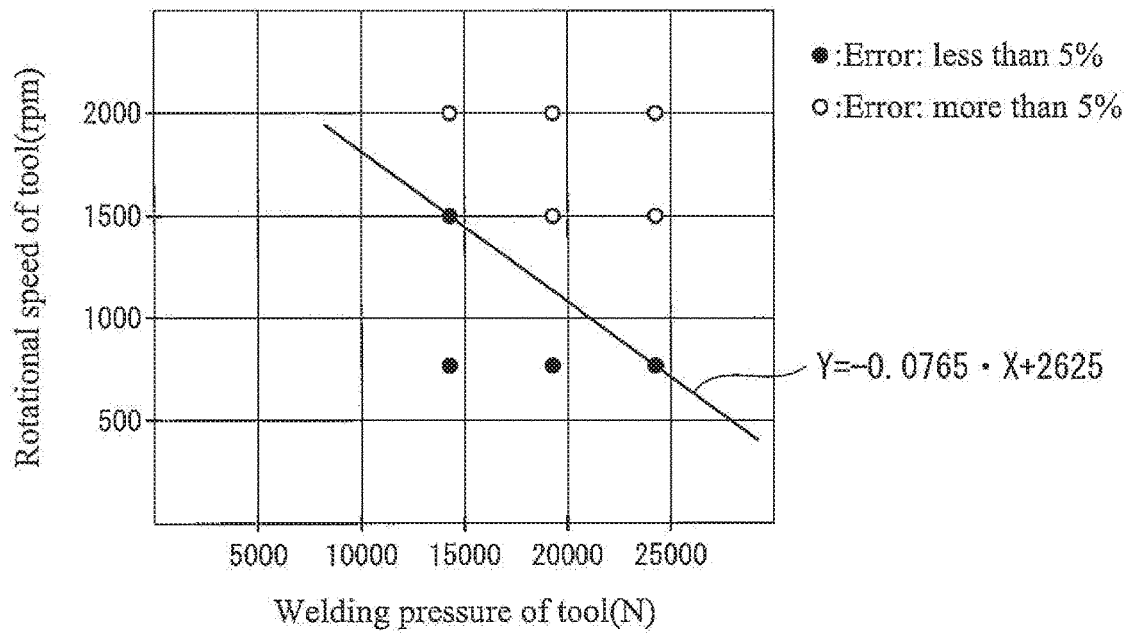
FIG. 10 is a graph showing plots of the result of FIG. 8.

FIG. 9 is a view showing results of the experiments for comparison performed under nine conditions in which the welding pressure and the rotational speed are changed. FIG. 10 is a graph showing the plots of the results. In the experiments for comparison, the friction stir spot welding of the pair of plate materials made of the steel material is performed, and the conditions other than the welding pressure and the rotational speed are the same. For example, it is assumed that the condition in which the temperature history of the tool temperature can be regarded as conforming to the temperature history of the welding temperature is the condition in which a maximum difference between the tool temperature and the welding temperature is less than 5% of the maximum value of the welding temperature. In FIG. 9, black plots meet this condition, while white plots do not meet this condition. As can be seen from FIG. 10, when the welding pressure of the tool is X and the rotational speed of the tool is Y, the temperature history of the tool temperature can be regarded as conforming to the temperature history of the welding temperature, in a range which meets the following formula 1. Therefore, in a case where the friction stir spot welding of an actual product is performed, the rotational speed of the tool is set to meet the following formula 1.

$$Y \leq -0.0765 \cdot X + 2625 \qquad \text{(formula 1)}$$

Figure 11:
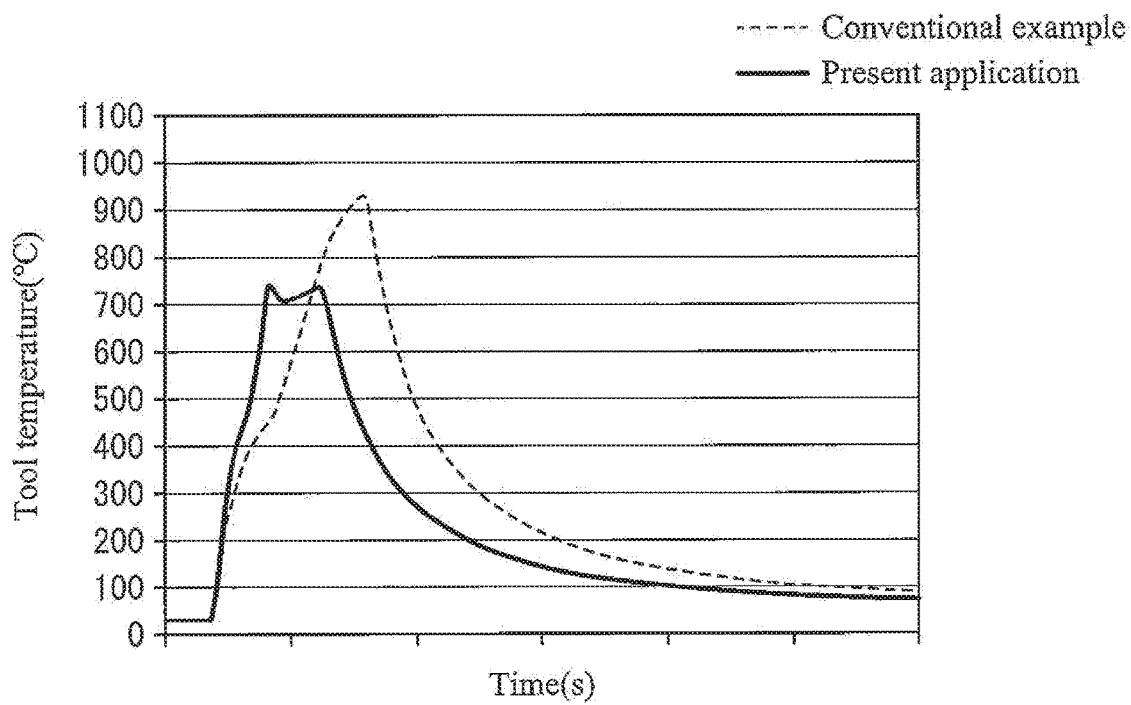
FIG. 11 is a graph showing a comparison between the tool temperature during friction stir spot welding of the conventional example and the tool temperature during the friction stir spot welding of the present application.
Figure 12:
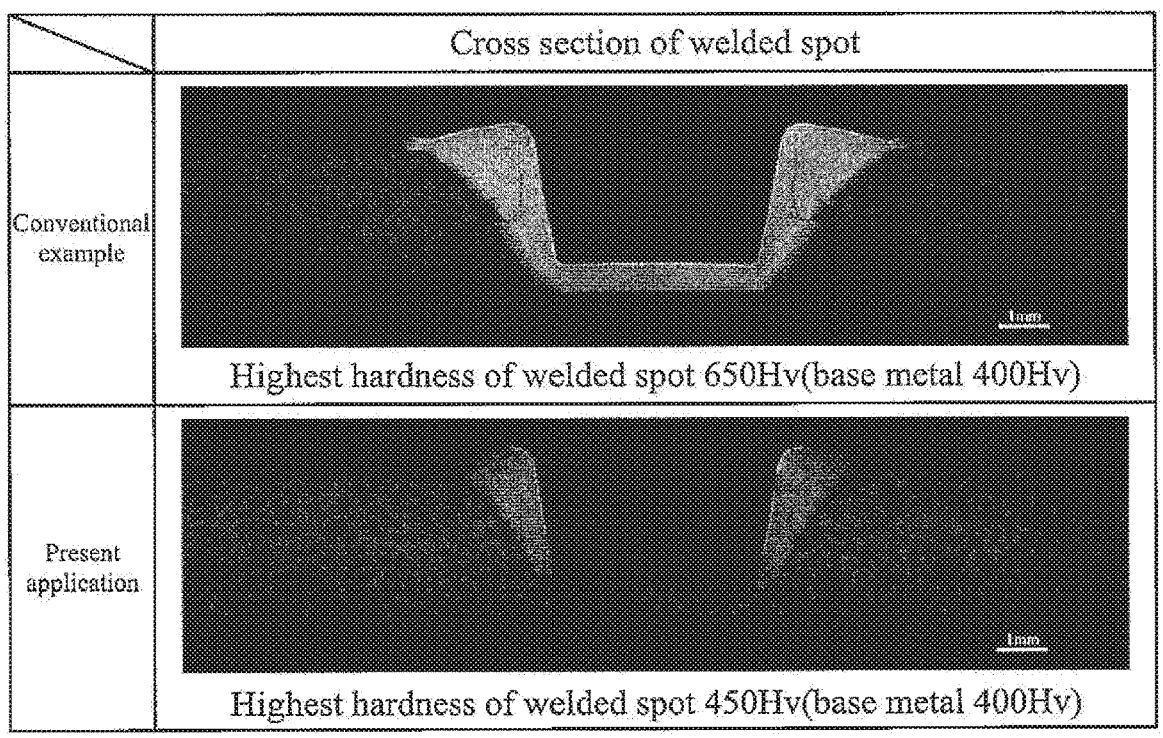
FIG. 12 is photographs showing the cross-section of a welded spot formed by the friction stir spot welding of the conventional example and a welded spot formed by the friction stir spot welding of the present application.

FIG. 11 is a graph showing a comparison between the tool temperature during friction stir spot welding of the conventional example and the tool temperature during the friction stir spot welding of the present application. FIG. 12 shows photographs showing the cross-section of a welded spot formed by the friction stir spot welding of the conventional example and the cross-section of a welded spot formed by the friction stir spot welding of the present application. As can be seen from FIGS. 11 and 12, in the friction stir spot welding of the conventional example, the maximum value of the tool temperature is higher than the $Ac_3$ transformation point of the workpiece and the austenite transformation occurs. Therefore, hardening (brittleness) of the composition caused by the quenching noticeably occurs. On the other hand, in the friction stir spot welding of the present application, the maximum value of the tool temperature is lower than the $Ac_3$ transformation point of the workpiece and the austenite transformation is not completed. Therefore, hardening of the composition caused by the quenching is suppressed. In addition, in the friction stir spot welding of the present application, the maximum value of the tool temperature is 700 degrees C. or higher and sufficiently high.

Therefore, the material of the workpiece is stirred well in a state in which the fluidity of a plasticized region of the workpiece is sufficiently high. Therefore, the welded spot has a cross-section which is good-looking and smooth. Although the welding pressure is controlled in this example, the plunge depth (tool position) may be controlled.

Figure 13:
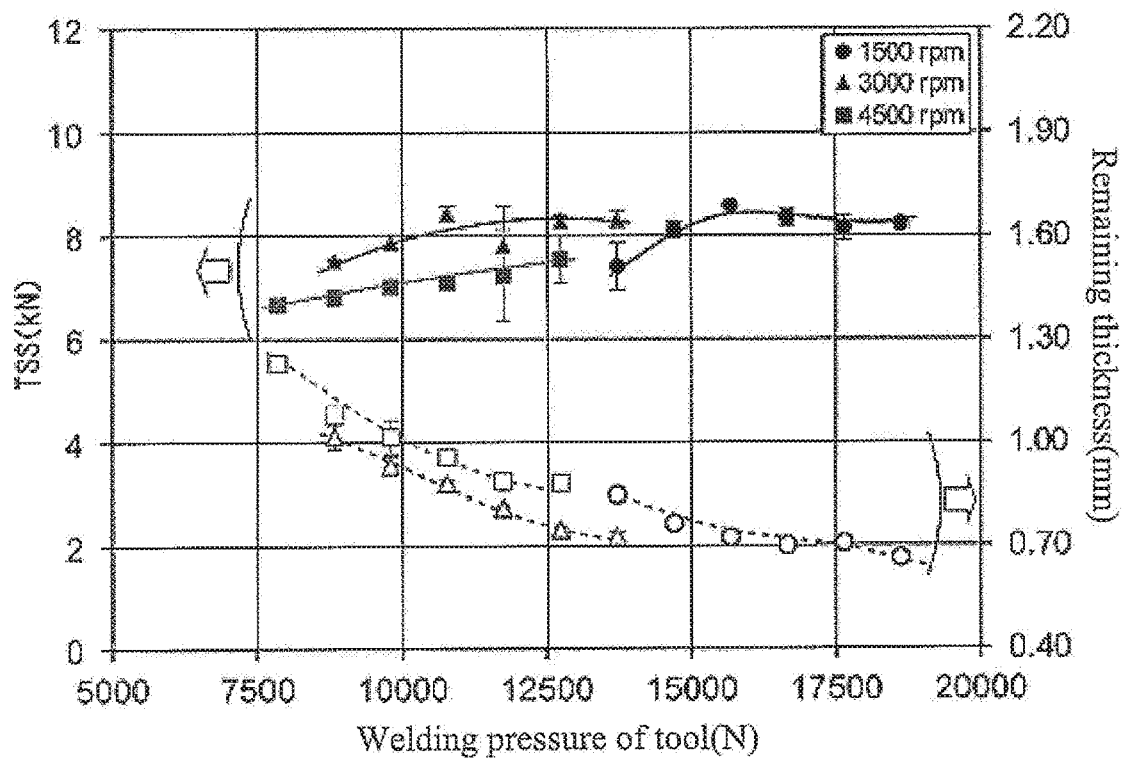
FIG. 13 is a graph of a result of another experiment showing a relation among the rotational speed, the welding pressure, a remaining thickness and a tensile shear strength (TSS).

FIG. 13 is a graph showing a result of another experiment showing a relation among the rotational speed, the welding pressure, a remaining thickness and a tensile shear strength (TSS). The remaining thickness is defined as a distance between a pin hole bottom and a lower plate reverse surface. As the remaining thickness is smaller, the plunge depth of the tool is larger. In FIG. 13, plots connected by solid lines correspond to a left vertical axis (TSS), while plots connected by broken lines correspond to a right vertical axis (remaining thickness). As shown in FIG. 13, as the remaining thickness of the workpiece is smaller, the TSS is larger, irrespective of the rotational speed of the tool. This may be due to the fact that an adequate welded spot in a top plan view can be formed by plunging the tool into the workpiece to a sufficient depth and friction-stirring the material, in the spot welding. As can be seen from 13, the remaining thickness can be effectively adjusted by controlling the welding pressure of the tool rather than controlling the rotational speed of the tool.

In the present embodiment, the welding temperature can be held (kept) within the set range ST by increasing and reducing the welding pressure (or plunge depth) of the tool according to the tool temperature in the temperature holding control. Therefore, the temperature of the workpiece W does not exceed a desired highest temperature (e.g., $Ac_3$ transformation point). For this reason, the friction stir spot welding is terminated at a time point when the tool 11 reaches the completion depth D2. Under this condition, the welding operation can be continued until the tool 11 reaches a sufficient depth of the lapped portions Wa. As a result, the welding temperature can be controlled with high accuracy to manage the transformation and the tool 11 can be plunged into the workpiece W to a sufficient depth.

In this case, the rotational speed of the tool is set to the rotational speed $R_1$ at which the tool temperature is regarded as being equal to the welding temperature of the workpiece W. This makes it possible to accurately hold(keep) the welding temperature of the workpiece W within a desired range with reference to the tool temperature. Therefore, it becomes possible to realize the friction stir spot welding with high accuracy in which the welded spot of the workpiece W does not exceed the desired highest temperature (e.g., $Ac_3$ transformation point), while realizing a highest possible welding temperature to stir the material better.

In Modified Example, during the temperature holding control, the controller may increase and reduce the rotational speed of the tool in a predetermined change pattern (e.g., sine wave or rectangular wave) as well as the welding pressure of the tool, to hold (keep) the tool temperature in the set range ST. By doing so, the tool temperature is adjusted based on the welding pressure and the rotational speed. This can improve responsivity of the temperature adjustment. In this case, the change pattern of the rotational speed of the tool and the change pattern of the welding pressure of the tool may have the same phase or opposite phases.

REFERENCE SIGNS LIST

1 friction stir spot welding device
8 rotation driving unit
10 displacement driving unit
11 tool
20 controller
ST set range
W1, W2 plate material
Wa lapped portions

The invention claimed is:

1. A friction stir spot welding device that performs spot welding of a plurality of plate materials, which are lapped to overlap each other, the friction stir spot welding device comprising:
   a displacement driving unit that displaces lapped portions of the plurality of plate materials and a tool relatively to each other;
   a rotation driving unit that rotates the tool; and
   a controller including a processor and a memory storing a temperature holding control program that includes computer-executable instructions to perform friction stir spot welding by controlling the displacement driving unit and the rotation driving unit so that the tool is plunged into the lapped portions while rotating the tool,
   wherein during the friction stir spot welding, the processor executes the temperature holding control program in which the processor:
     controls the rotation driving unit so that a rotational speed of the tool is set to a value that is equal to or lower than a predetermined rotational speed at which a temperature of the tool is regarded as being equal to a welding temperature of the lapped portions, and
     controls the displacement driving unit to repeatedly increase and decrease a welding pressure or a plunge depth of the tool so that the temperature of the tool is maintained within a predetermined set temperature range, and so that the welding pressure or the plunge depth of the tool is:
       increased and decreased in a repeating constant and continuous pre-set change pattern that is performed as the temperature of the tool is within the predetermined set temperature range,
       decreased in a state that the temperature of the tool exceeds the predetermined set temperature range, and
       increased in a state that the temperature of the tool is below the predetermined set temperature range.

2. The friction stir spot welding device according to claim 1, wherein during execution of the temperature holding control program, the processor controls the displacement driving unit so that at least one of a frequency of the change pattern and an application time of a maximum welding pressure is:
   reduced when the temperature of the tool exceeds the predetermined set temperature range, and
   increased when the temperature of the tool falls below the predetermined set temperature range.

3. The friction stir spot welding device according to claim 1, wherein in response to the processor determining that the tool has reached a predetermined completion depth of the lapped portions in the temperature holding control program, the processor controls the displacement driving unit to retract the tool out of the lapped portions.

4. The friction stir spot welding device according to claim 1, wherein prior to execution of the temperature holding control program, the processor executes an initial plunge control in which the processor controls the rotation driving unit and the displacement driving unit so that the tool is plunged into the lapped portions in a state in which the rotational speed of the tool is higher than the rotational speed of the tool during execution of the temperature holding control program.

5. The friction stir spot welding device according to claim 1, wherein the processor obtains, as the temperature of the tool, an inner temperature of the tool in a region that is within 2 mm from a contact surface of the tool which contacts the lapped portions.

6. The friction stir spot welding device according to claim 1, wherein during execution of the temperature holding control program, the processor controls the rotation driving unit to adjust the rotational speed of the tool so that the temperature of the tool is maintained in the predetermined set temperature range.

7. The friction stir spot welding device according to claim 1, wherein an upper limit threshold of the predetermined set range is set to a temperature lower than an $Ac_3$ transformation point.

8. A friction stir spot welding method that performs spot welding of a plurality of plate materials, which are lapped to overlap each other, the friction stir spot welding method comprising:

plunging a tool into lapped portions of the plurality of plate materials while rotating the tool to initiate friction stir spot welding;

rotating the tool at a rotational speed at which a temperature of the tool is regarded as being equal to a welding temperature of the lapped portions, during the friction stir spot welding; and repeatedly adjusting a welding pressure or plunge depth of the tool so that the temperature of the tool is maintained within a predetermined set temperature range during the friction stir spot welding, and so that the welding pressure or the plunge depth of the tool is:
  increased and decreased in a repeating constant and continuous pre-set change pattern that is performed as the temperature of the tool is within the predetermined set temperature range,
  decreased in a state that the temperature of the tool exceeds the predetermined set temperature range, and
  increased in a state that the temperature of the tool is below the predetermined set temperature range.

* * * * *